United States Patent [19]

Mlynarczyk

[11] 3,764,107

[45] Oct. 9, 1973

[54] SPRING HANDLING APPARATUS

[75] Inventor: Joseph E. Mlynarczyk, Detroit, Mich.

[73] Assignee: General Motors Corporation, Detroit, Mich.

[22] Filed: May 15, 1972

[21] Appl. No.: 253,315

[52] U.S. Cl. .................... 254/10.5, 29/218, 29/227
[51] Int. Cl. ............................................. B23p 19/04
[58] Field of Search ........................... 29/215–218, 227, 237; 254/10.5, 100; 24/243 D, 248 S, 269

[56] References Cited
UNITED STATES PATENTS

| | | | |
|---|---|---|---|
| 1,198,281 | 9/1916 | Ryan | 29/218 |
| 2,920,383 | 1/1960 | Aydelott | 29/237 |
| 1,094,400 | 4/1914 | Burgess | 04/248 SA |

Primary Examiner—Othell M. Simpson
Assistant Examiner—Harold P. Smith, Jr.
Attorney—Warren E. Finken et al.

[57] ABSTRACT

Apparatus for effecting compression of a helical coil spring in its operative environment, the apparatus including a pair of pivotally connected jaws adapted to engage axially spaced coils of the spring, a cable element attached at one end to one of the jaws and at the other end to a nut member slidably supported on the other of the jaws, and a screw actuator rotatably supported on the other jaw and threadedly engaging the nut member so that rotation of the screw actuator shifts the nut member to place the cable element in tension to effect closing of the jaws and compression of the spring.

4 Claims, 5 Drawing Figures

Patented Oct. 9, 1973 3,764,107
2 Sheets-Sheet 1
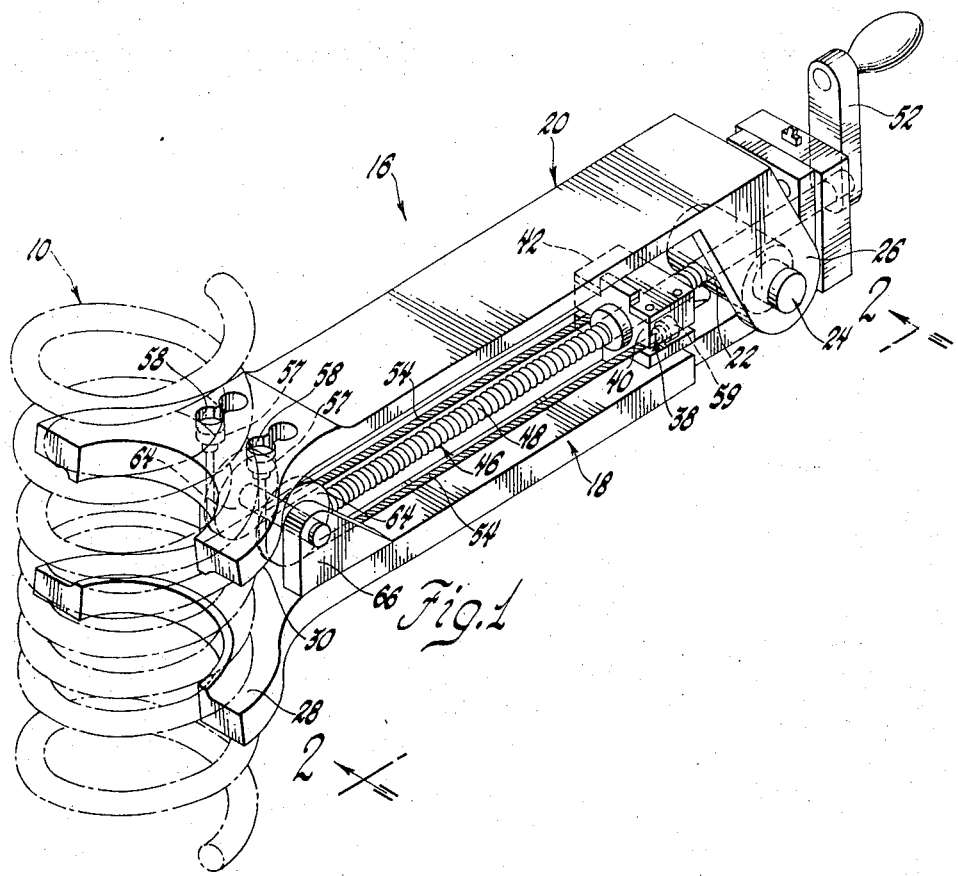
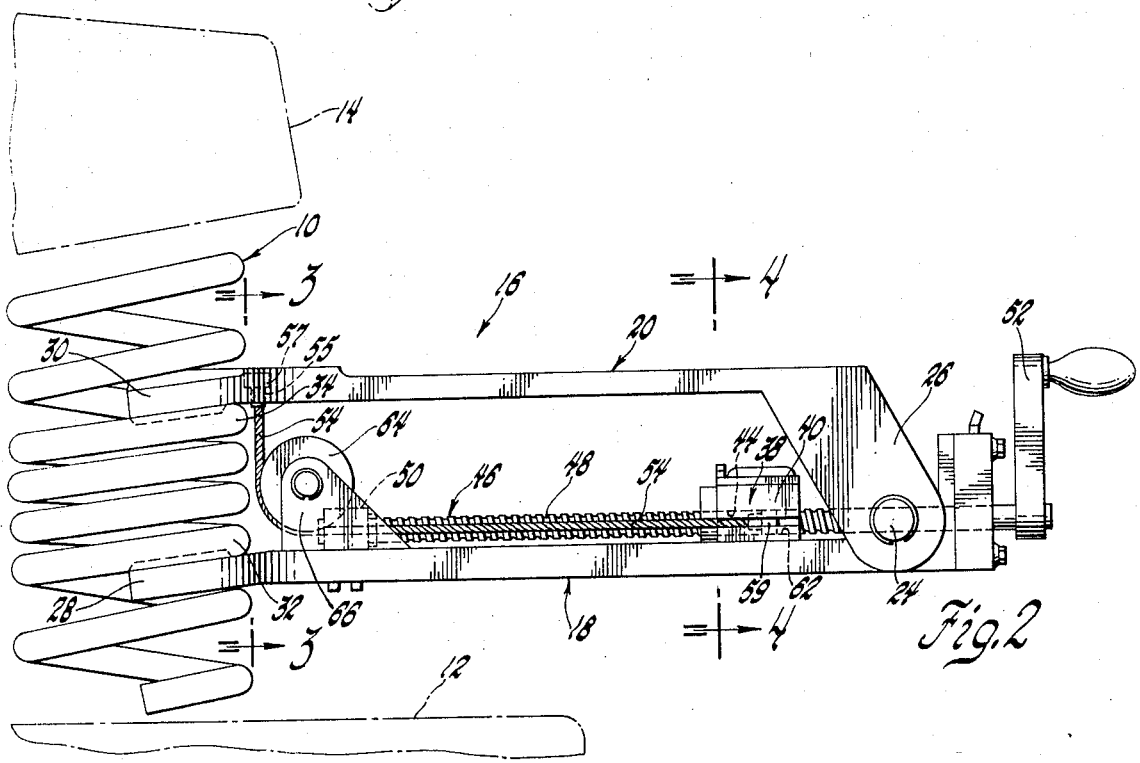

SPRING HANDLING APPARATUS

This invention relates generally to spring handling apparatus and more particularly to apparatus for effecting axial compression of a helical coil spring to facilitate removal and subsequent installation of the spring from its operative environment.

In many heavy equipment installations or large mechanical apparatus applications, helical coil springs are employed to isolate one element from shock forces imparted to another element. Where the elements involved are relatively heavy or where the shock forces are apt to be of substantial magnitude, the springs employed are typically of relatively high rate. This is particularly true in the case of coil springs incorporated into automobile suspensions. While the high rate of these springs does not usually present significant problems during initial assembly of the vehicle, subsequent vehicle service procedures requiring removal of the spring or, at least, separation thereof from the spring seats are often complicated or delayed by the necessity of using handling apparatus which requires prior removal of one or more other suspension system components, such as shock absorbers, or which require time consuming manipulation of the suspension system with hoisting equipment and chains. Spring handling apparatus according to this invention represents a reduction to practice of an improved apparatus for effecting axial compression of a helical coil spring in its operative environment which apparatus is relatively compact, simple to operate, and economical to manufacture.

Accordingly, the primary feature of this invention is that it provides an improved spring handling apparatus. Another feature of this invention is that it provides an improved spring handling apparatus particularly adapted to effect compression of a helical coil spring in its operative environment and especially a coil spring in an automobile suspension system. Still another feature of this invention is that it provides an improved spring handling apparatus adapted to effect compression of a helical coil spring from exteriorly of the latter and without the necessity of prior removal of elements disposed within the spring. A still further feature of this invention resides in the provision of spring handling apparatus including a pair of pivotably connected jaws adapted to engaged axially spaced coils of the spring, a flexible and inextensible connecting member attached to one of the jaws and trained over a guide on the other so that tension in the connecting member effects closing of the jaws and axial compression of the spring, and a screw and nut type actuator disposed on the other jaw, the connecting member being attached to the nut portion of the actuator and the screw portion being rotatably disposed on the other jaw so that rotation of the screw portion effects bodily shiftable movement of the nut portion thereby to place the connecting member in tension for effecting closing of the jaws.

These and other features of this invention will be readily apparent from the following specification and from the drawings wherein:

FIG. 1 is a perspective view of spring handling apparatus according to this invention;

FIG. 2 is a view taken generally along the plane indicated by lines 2—2 in FIG. 1;

Figure 3:
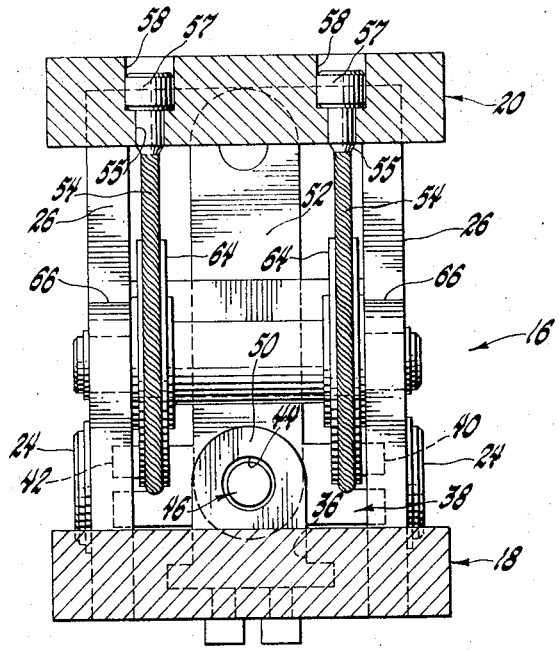
FIG. 3 is an enlarged sectional view taken generally along the plane indicated by lines 3—3 in FIG. 2.

Referring now to FIGS. 1 and 2 of the drawings, thereshown in phantom is a helical coil spring 10 disposed in compression between a lower seat 12 and an upper seat 14. The upper and lower seats shown are merely representative of any two separate bodies between which it is desired to place a shock force isolating element. The upper and lower seats may, for example, represent components of an automobile type independent suspension system, the upper seat 14 representing a portion of the vehicle body or frame and the lower seat 12 representing a portion of the lower pivotally supported control arm of the suspension system. Further, in such automobile suspension applications, service procedures often require removal or, at least, compression of the spring independently of the seats. To accomplish this, spring handling apparatus according to this invention and designated generally 16 is provided.

Referring again to FIGS. 1 and 2, the spring handling apparatus 16 includes a lower bar 18 and an upper bar 20. At one end of the lower bar there is rigidly disposed a cylinder 22 in the opposite ends of which are supported a pair of pivot pins 24. A pair of ears 26 integral with the upper bar 20 are rotatably journaled on respective ones of the pins 24 in the cylinder 22 thereby to connect the upper bar and the lower bar for relative pivotal movement. At the distal end of the lower bar 18 there is disposed an integral coil engaging jaw 28 and at the distal end of the upper bar 20 there is disposed a similar coil engaging jaw 30. The jaws 28 and 30 have opposing semi-circular surfaces incorporating helical curvature corresponding generally to the helix angle of the spring 10 so that, as best seen in FIGS. 1 and 2, the jaws fit on and compliment respective ones of a pair of axially spaced coils 32 and 34 of the spring 10.

Figure 4:
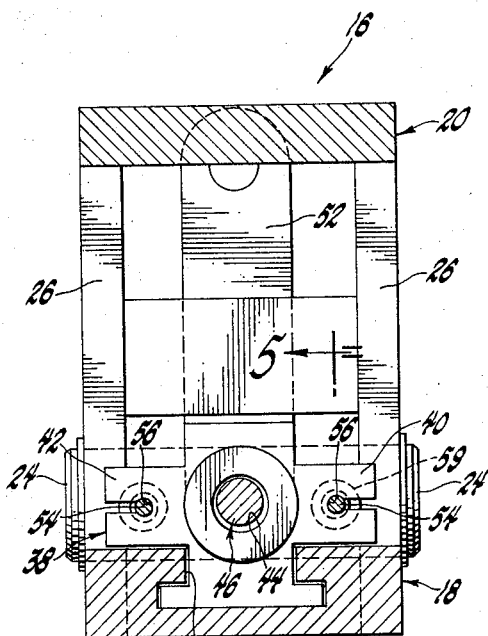
FIG. 4 is an enlarged sectional view taken generally along the plane indicated by lines 4—4 in FIG. 2.
Figure 5:
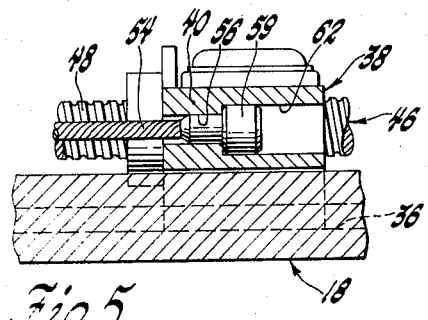
FIG. 5 is a sectional view taken generally along the plane indicated by lines 5—5 in FIG. 4.

Referring now to FIGS. 1, 2, 4 and 5, the lower bar 18 includes a T-slot 36 extending longitudinally generally over the entire length thereof. The T-slot slidably receives a nut member 38 which includes a pair of wing portions 40 and 42 and a threaded bore 44. The nut member may, of course, have conventional threads therein or it may be of the recirculating ball type where less friction is desired. A screw shaft 46 having a thread 48 over generally the entire length thereof is rotatably supported at one end on a journal block 50, FIG. 2, rigidly attached to the lower bar and at the other end on the cylinder 22, the screw shaft being disposed in generally parallel relation to and directly above the T-slot 36 and projecting outwardly beyond the cylinder 22. The screw shaft is received in the threaded bore 44 in the nut member and has rigidly attached to the outboard end thereof a crank handle 52. Accordingly, rotation of the crank handle effects rotation of the screw shaft and concurrent bodily shiftable movement of the nut member along the T-slot 36.

As seen best in FIGS. 1, 2, 3 and 5, a pair of identical flexible and inextensible cable elements 54 are disposed between the upper bar 20 and the nut member 38. More particularly, the cable elements 54 extend through respective ones of a pair of bores 55 in the upper bar 20, FIG. 3, and a similar pair of bores 56 in the nut member, FIG. 5. Further, each cable element has affixed to the left end thereof a respective one of a pair of retainers 57 which are received in respective ones of a pair of counter bores 58 associated with the bores 55. Similarly, each cable element has affixed to the right end thereof a respective one of a pair of retainers 59 which are received in respective ones of a pair of counter bores 62 associated with the bores 56. Intermediate the ends thereof, the cable elements 54 are trained over respective ones of a pair of pulleys 64 rotatably journaled on corresponding ones of a pair of lugs 66 rigidly attached to the lower bar 18 adjacent the engaging jaw 28. Accordingly, bodily shiftable movement of the nut member 38 rightwardly, FIG. 2, along the lower bar places the cable elements 54 in tension to effect closing or converging relative pivotal movement between the upper and lower bars.

Describing now a typical operational sequence of the spring handling apparatus 16; when it is desired for one reason or another to effect separation of the ends of the spring from the seats 12 and 14 without removing the seats, the apparatus 16 is applied to the spring as shown in FIGS. 1 and 2. More particularly, from exteriorly of the coil the coil engaging jaws 28 and 30 are brought into contact with the axially spaced coils 32 and 34 of the spring whereupon the crank handle 52 is rotated to effect rightward bodily shiftable movement of the nut member 38, FIGS. 1 and 2. Such movement of the nut member, of course, places the cable elements 54 in tension thereby to effect closing or converging relative pivotal movement between the upper and lower bars. Consequently, the coils of the spring 10 between the coils 32 and 34 are compressed thereby to decrease the length of the spring for permitting separation between the end coils of the latter and the spring seats. When it is desired to reseat the spring the crank handle is merely rotated in the opposite direction.

It will, of course, be apparent to those skilled in the art that the apparatus 16 functions to compress the spring 10 without the necessity of first removing suspension elements disposed within the spring, as for example a shock absorber. Further the bars 18 and 20 may have various configurations other than the relatively flat configuration shown to facilitate engagement of the jaws 28 and 30 with the coils of the spring while avoiding other suspension system components located adjacent or in proximity to the spring.

Having thus described the invention what is claimed is:

1. Apparatus for effecting compression of a coil spring member comprising, in combination, a pair of jaws adapted for engagement on axially spaced coils of said coil spring member from exteriorly of the latter, pivot means disposed between said jaws adapted to support one of said jaws on the other for pivotal movement relative thereto, converging relative pivotal movement between said jaws effecting compression of the spring coils between said jaws and axial collapse of said coil spring member, a flexible and inextensible connecting member disposed between said jaws in a manner whereby tension in said connecting member effects converging relative pivotal movement between said jaws, and selectively operable control means disposed between said connecting member and one of said jaws for placing said connecting member in tension.

2. Apparatus for effecting compression of a coil spring member comprising, in combination, a pair of jaws adapted for engagement on axially spaced coils of said coil spring member from exteriorly of the latter, pivot means disposed between said jaws adapted to support one of said jaws on the other for pivotal movement relative thereto, converging relative pivotal movement between said jaws effecting compression of the spring coils between said jaws and axial collapse of said coil spring member, a flexible inextensible connecting member, means connecting one end of said connecting member to one of said jaws, an anchor, means mounting said anchor on the other of the jaws for bodily shiftable movement, and means connecting the other end of said connecting member to said anchor so that bodily shiftable movement of the latter in one direction effects converging pivotal movement between said jaws through tension in said flexible connecting member.

3. Apparatus as recited in claim 2 further including selectively operable control means associated with said anchor for effecting selective bodily shiftable movement of the latter.

4. Apparatus for effecting compression of a coil spring member comprising, in combination, a pair of jaws adapted to engage axially spaced coils of said coil spring member from exteriorly of the latter, pivot means disposed between said jaws adapted to support one of said jaws on the other for pivotal movement relative thereto, converging relative pivotal movement between said jaws being operative to effect compression of the spring coils between said jaws and axial collapse of said coil spring member, a flexible inextensible connecting member, means connecting one end of said connecting member to said one jaw, a pulley rotatably supported on said other jaw, said connecting member being trained over said pulley so that a tensible force on the other end of said connecting member effects converging relative pivotal movement between said one jaw and said other jaw, an anchor, means mounting said anchor on said other jaw for bodily shiftable movement relative to the latter a screw and nut actuator assembly including a screw portion rotatably disposed on said other jaw and a nut portion rigidly attached to said anchor, relative rotation between said screw said nut portions effecting bodily shiftable movement of said anchor, and manual control means associated with said screw portion adapted to effect selective rotation thereof thereby to shift said anchor in a manner placing said connecting member in tension.

* * * * *